Patented Sept. 8, 1931

1,822,663

UNITED STATES PATENT OFFICE

WILLIAM MANO, OF FLUSHING, NEW YORK

PIPE JOINT COMPOUND

No Drawing.    Application filed December 8, 1927.   Serial No. 238,721.

This invention relates to a composition of matter adapted to be used as a pipe joint compound and contemplates the provision of a compound designed to seal efficiently joints for pipe lines carrying steam, oils or other liquids, or gases, which are subjected to heat, pressure or chemical action or to any normal combination of heat, pressure and chemical action.

It has heretofore been found extremely difficult, for instance, to make the joints in pipe lines for illuminating gas, leakproof. The substance known as "drip oil" attacks the sealing compounds heretofore in general use, and ultimately allows leakage at the joints with the dangers consequent thereto. My improved compound, however, is impervious to and is not affected by drip oil, nor by common weak acids, oils, salts, heat or moisture. It also withstands comparatively high pressures, and is therefore an ideal substance for use in pipe joints. I have found that my improved compound when used in the usual manner for pipe joints, forms an effective seal, withstanding pressures as high as two hundred and fifty pounds per square inch, the high temperatures of superheated steam, and the chemical action of the acids and oils found in or condensing from illuminating gas, during the production or distribution of such gas.

The compound may be prepared in part as a liquid or paste and in part as a powder, the paste and powder being intended to be later combined, or it may be prepared entirely in powdered form and enough water added to as much of the powder as needed for the joint to form a paste of the desired consistency. I will first describe my improved product and the production thereof when partly in liquid or paste form and partly in powdered form.

The liquid or paste contains the following ingredients in about the following proportions by weight.

Magnesium chloride solution of about 25% Baumé consisting of 35% of powdered magnesium chloride and an equal quantity of water.

Magnesium sulphate solution consisting of 5% magnesium sulphate and about 10% of water.

Lead acetate solution 2%.

Glycerine 13%.

It will be understood that the above proportions are approximate and may be considerably varied without materially affecting the quality of the composition.

The powder to be mixed with the liquid solution above described consists of the following ingredients, all in dry powdered form:

Magnesium oxide 55%, fluorspar 12%, graphite 18%, dextrine 5%, aluminum oxide 10%.

The liquid powder may be shipped to the place where they are to be used in separate containers and are mixed when needed in the proportion of about six pounds (making three quarts) of the liquid to eight pounds of the powder, these proportions forming about one gallon of the compound. It will be seen that the mixture of liquid and powder weighs 14 lbs. in the proportions above stated. Since the graphite forms 18% of the 8 lbs. of powder, there will be about 10.3% of graphite in the entire 14 lbs. of the mixture. Similarly, since there is 10% of aluminum oxide in the 8 lbs. of powder, the percentage of aluminum oxide in the entire 14 lbs. of the mixture will be about 5.7%. The liquid and powder will keep indefinitely without deterioration. When mixed, however, the setting action begins, but complete setting does not occur for a long enough period to allow the joint to be properly sealed and the pipes properly adjusted in the line.

The setting action of the compound is due to the combination of the magnesium chloride and the magnesium oxide to form an oxychloride of magnesium. While this oxychloride has long been known, it has not previously been possible to use the same as a pipe joint cement because of its tendency to be attacked by moisture, thereby rusting the metal with which it is in contact, and because the oxychloride, by itself, tends to adhere to and to join the metal surfaces so firmly that said surfaces cannot be separated without damage, particularly in a pipe joint. Furthermore, the oxychloride in itself does not possess sufficient hardness for the purpose of sealing pipe joints and it frequently sets too fast to allow the joint to be properly sealed or screwed up. The magnesium sulphate tends to cause the oxychloride to crystallize and harden better than it ordinarily would, while the lead acetate helps the setting action and also keeps out the moisture and prevents rusting.

I have found that by using glycerine, I am able to maintain the workability of the compound for a longer period so that in large construction work the joints need not be completely finished in so short a time, but may be later adjusted after the preliminary adjustment is made. The fluorspar in the composition serves to harden the compound when it has dried. It also helps in preventing the access of moisture and prevents rusting. The graphite acts as a means for lessening the adhesive tendency of the compound, thereby preventing permanent sticking of the compound to the pipes or pipe threads. It therefore becomes possible to disassemble the joints by first loosening the compound from the metal in the usual way as by tapping the joint sharply and thereby breaking the adhesive contact of the compound with the pipes and the threads thereof. The dextrine in the composition serves as a binder, while the aluminum oxide aids in preventing the attack of the compound by moisture and thereby aids in preventing rusting of the joint, and also serves to soften the compound so that it does not become undesirably hard.

I have found my improved composition to be a good substitute for the lead calking of pipe joints, particularly those used in plumbing, as for instance in soil pipes. It has heretofore been necessary to calk such joints with oakum and molten lead. When my improved product is used, however, the lead may be entirely dispensed with and the oakum impregnated with the compound in a manner which will be easily understood by those skilled in the art, an additional quantity of the compound then being used, if desired, to complete the joint.

Where it is not necessary to maintain the pipe joint compound soft and workable for a considerable period of time, the compound may be made in the form of powder. In that case only a sufficient amount of the powder for the joints to be sealed immediately is used at any one time, it being merely necessary to add water to form a paste of the desired consistency. In the powder, I use substantially the proportions above described of the various ingredients excepting that the glycerine is entirely omitted, since it becomes unnecessary to retard the setting action to any substantial extent, in view of the fact that any desired quantity of the compound in paste form can be prepared at a time by merely adding water, the water being also omitted from the powdered compound until it is to be used. However, in order to prevent the undesired combination of the magnesium oxide with the magnesium chloride before the compound is to be used, I have found it advisable to thoroughly dry the magnesium chloride by first heating to a temperature of about 250° Fahrenheit more or less, thereby extracting all the moisture. The magnesium chloride so heated, and dried, tends to cake or to form a dry stone. This cake or stone, I grind thoroughly to a powder which can pass through a 250 mesh screen. About 25% by weight of the magnesium chloride so dried and ground is incorporated in the powder with the ingredients in about the same proportions as above mentioned in connection with the partly liquid and partly powdered compound previously described, excepting that as explained, no glycerine and no water are used. It will therefore be seen that the percentage of graphite based on the total powder mixture is slightly greater than the percentage of graphite based on the total mixture of liquid and powder previously described, amounting to about 13% of the total when the powder containing magnesium chloride is used. Similarly, the percentage of aluminum oxide based on the total in the completely powdered form of my composition is slightly greater than 7% when the proportions above described are used. I have found that when the powdered form of the compound is made, it will keep indefinitely in its powdered form without danger of setting or deterioration and will form an efficient pipe joint seal.

It will be seen that I have provided an improved pipe joint which can be easily applied, in which comparatively inexpensive ingredients are used, which is impervious and unaffected by drip oil and most chemicals when dry, which will withstand moisture, high pressures and high temperatures, and which is therefore particularly useful in connection with pipe lines in which superheated steam, oils and gases of various kinds are conducted.

I do not wish to be understood as limiting myself to the exact proportions and ingredients described herein, as it will be understood that various equivalents may be used and the proportions varied to a considerable extent, but I intend to claim the invention as broadly as may be permitted by the prior state of the art and the terms of the appended claims.

I claim:

1. A pipe joint composition comprising magnesium chloride, magnesium sulphate, lead acetate, glycerine, magnesium oxide, fluorspar, graphite, dextrine, aluminum oxide and water, and serving to seal a joint while adhering thereto insufficiently to prevent forcible separation thereof without damage.

2. A pipe joint composition including an oxychloride of magnesium, magnesium sulphate, fluorspar, graphite, dextrine and aluminum oxide, and serving to seal a joint while adhering thereto insufficiently to prevent forcible separation thereof without damage.

3. A pipe joint composition adapted to be mixed with water consisting in the greater part of magnesium oxide, a comparatively large amount of magnesium chloride and comparatively small amounts of fluorspar, dextrine and graphite.

4. A pipe joint composition in powder form adapted to be mixed with water including magnesium chloride which has been heated to remove the moisture therein and ground into powdered form, magnesium oxide, magnesium sulphate, lead acetate, fluorspar, graphite, dextrine and aluminum oxide, and serving to seal a joint while adhering thereto insufficiently to prevent forcible separation thereof without damage.

5. A comparatively slow setting oxychloride of magnesium pipe joint composition including small quantities of glycerine, aluminum oxide and graphite, and serving to seal a joint while adhering thereto insufficiently to prevent forcible separation thereof without damage.

6. A comparatively slow setting pipe joint composition consisting largely of an oxychloride of magnesium carried by a water vehicle with comparatively small quantities of aluminum oxide, fluorspar and graphite, and adhering to the joint parts insufficiently to prevent proper separation thereof after the compound has dried.

7. A pipe joint composition consisting of a liquid in the following proportions: water 45%, magnesium chloride 35%, magnesium sulphate 5%, lead acetate 2%, glycerine 13%, to six pounds of which eight pounds of a powder consisting of the following ingredients are added: magnesium oxide 55%, fluorspar 12%, graphite 18%, dextrine 5%, aluminum oxide 10%, to form about one gallon of the mixture.

8. A pipe joint composition comprising a comparatively large amount of magnesium oxide, a lesser amount of magnesium chloride and comparatively small amounts of fluorspar, graphite and aluminum oxide with lesser amounts of magnesium sulphate, lead acetate and dextrine.

9. A pipe joint composition comprising a magnesium oxychloride base and including a small quantity of graphite, and having the property of sealing pipes together at the joint and adhering thereto sufficiently for that purpose but insufficiently to prevent undamaged separation of the joint.

10. A pipe joint composition of the oxychloride type, including about 6% of aluminum oxide, graphite, and fluorspar, and having the property of permitting forcible separation of the joint in which it is used without injury to the pipe.

11. A magnesium oxychloride pipe joint composition, adapted to be mixed with water, including a total of about 6% of aluminum oxide, a dextrine binder, a fluorspar hardener, and graphite.

12. An oxychloride of magnesium for use as a pipe joint composition including approximately 10% of graphite and adhering to the joint parts insufficiently to prevent proper separation thereof after the composition has dried.

WILLIAM MANO.